Oct. 16, 1962   G. H. HUTCHENS ETAL   3,058,343
APPARATUS FOR MONITORING YARN SURFACE DEFECTS
Filed Nov. 14, 1958
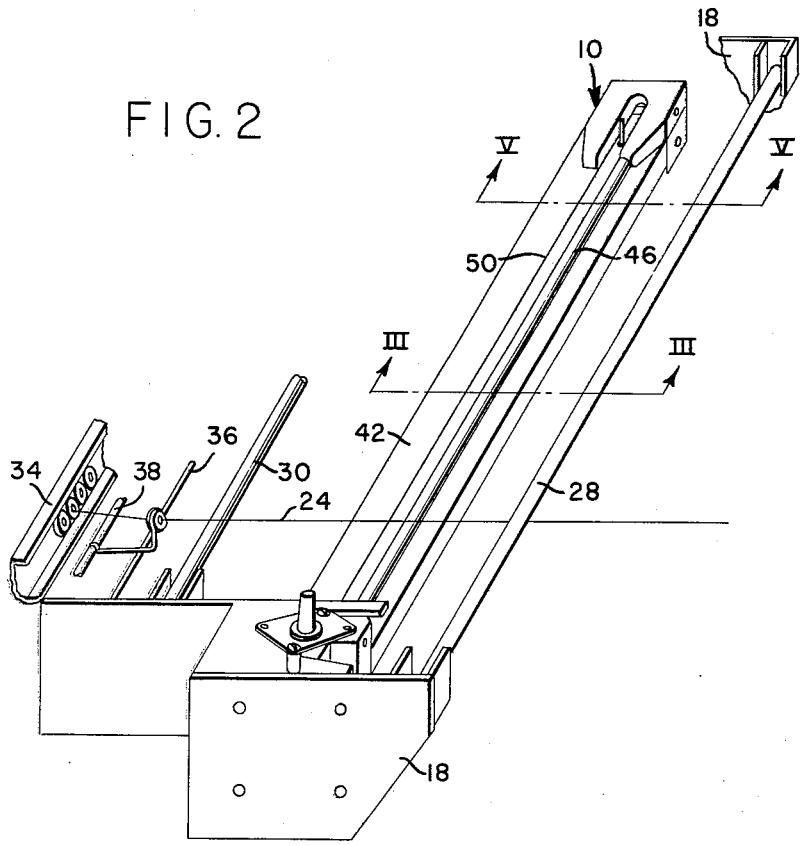
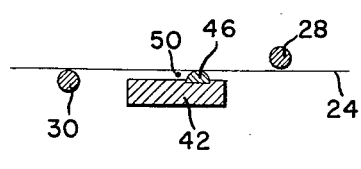
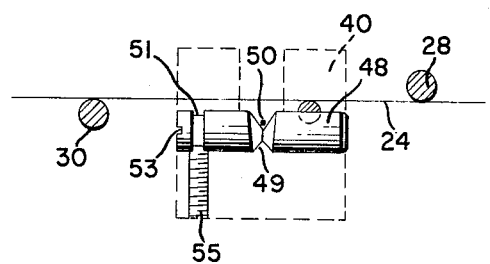

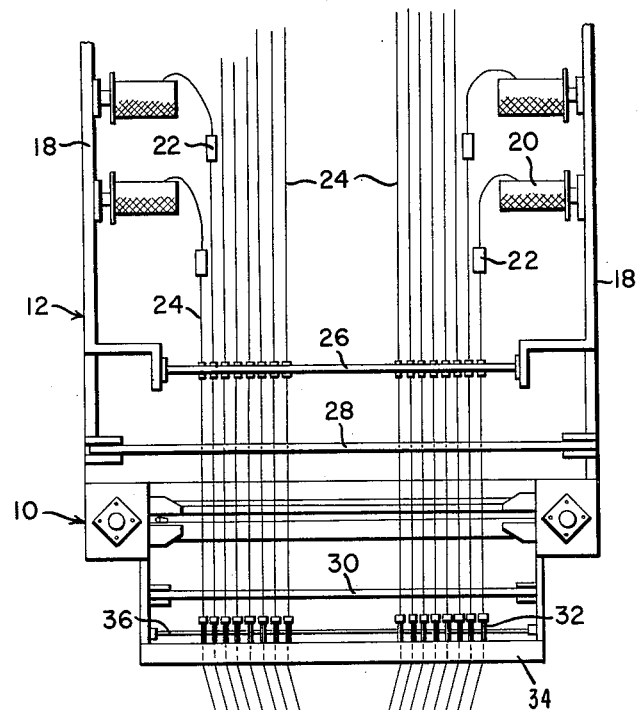
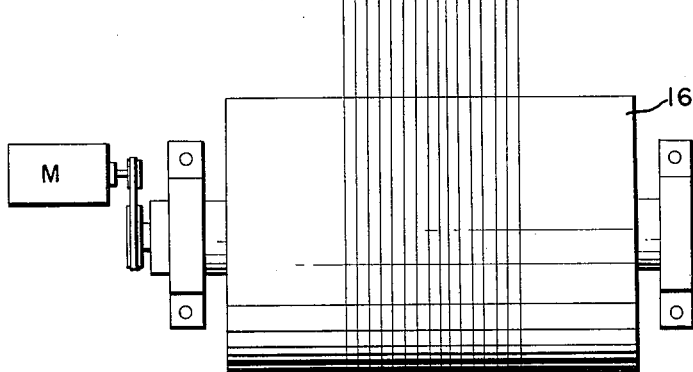
FIG. 1

United States Patent Office 3,058,343
Patented Oct. 16, 1962

3,058,343
APPARATUS FOR MONITORING YARN
SURFACE DEFECTS
George H. Hutchens and William L. Duncan, Waynesboro, Va., assignors to E. I. du Pont de Nemours and Company, Wilmington, Del., a corporation of Delaware
Filed Nov. 14, 1958, Ser. No. 774,017
7 Claims. (Cl. 73—160)

This invention relates generally to quality monitoring of continuously moving filamentary structures and, more particularly, to the in-process detection of defects and irregularities in moving yarns, threads, wires and the like.

The principal object of the present invention is the automatic, in-process detection of defects in a moving yarn-end or other filamentary structure.

Another object of the present invention is the provision of an apparatus for monitoring surface irregularities and other defects in a multi-end process, such as the beaming of textile fibers.

A further object of the present invention is to provide, in the monitoring apparatus, suitable circuitry and equipment for counting the defects and for stopping the entire process should either the defect rate or amplitude become excessive.

Additional objects of this invention relate to the manner in which an elongated detection element is positioned relative to a plurality of filamentary structures so that surface irregularities in the structures will contact and cause movement of the detection element; to the manner in which a transducer is employed to convert all movements of the detection element into usable electric signals; and to the manner in which the sensitivity of the monitoring apparatus may be varied by adjusting the position of the flexible detection element with respect to the moving filamentary structures.

With these and other objects in view, the apparatus embodiment chosen for illustration comprises generally a frame, means on the frame for guiding a plurality of yarn-ends into a warp, a flexible detection element traversing but not normally contacting the warp, and a transducer means for converting all movements imparted to the detection element by surface irregularities into usable electric signals. Such apparatus will be described in detail hereinafter, reference being had to the accompanying drawings, wherein:

FIGURE 1 is a schematic plan view of a warping creel with which the monitoring apparatus of the present invention has been illustrated;

FIG. 2 is an enlarged fragmentary perspective view of the detector unit of FIG. 1;

FIG. 3 is a vertical sectional view, taken on line III—III of FIG. 2 and looking in the direction of the arrows;

FIG. 5 is a vertical sectional view, taken on line V—V of FIG. 2 and looking in the direction of the arrows, parts of the detector unit having been shown only in phantom.

Figure 4:
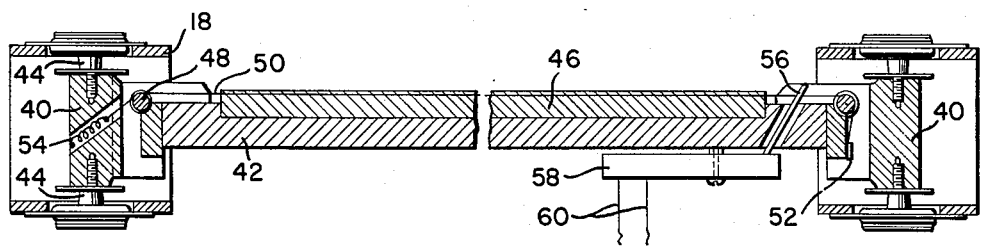
FIG. 4 is a longitudinal sectional view, showing constructional details of the detector unit of FIG. 2.

An apparatus which is in some respects similar to that disclosed herein is shown in U.S. Patent 2,524,579 to Taylor. Such apparatus is, however, not suitable for the continuous, in-process detection of defects in a multi-end process and differs primarily in the provision of a bender type crystal which is mounted in the length of a piano wire.

Referring now to FIG. 1, the monitoring apparatus is broadly designated by the numeral 10 and has been illustrated in conjunction with a creel 12, a traverse guide 14 and a motor driven reel 16.

The creel 12 includes a frame 18 which is located on suitable upright supports and which carries a yarn package 20 and a tension device 22 for each of a plurality of yarn-ends 24. The yarn-ends each pass through a first eyelet guide 26, under a first ceramic guide bar 28, over the monitoring apparatus 10, over a second ceramic guide bar 30, through a drop wire 32, and through a second eyelet guide 34. These various guides function to warp the plurality of yarn-ends 24, i.e., to gather them into a thread sheet of equi-spaced, co-planar, moving, filamentary structures. From the creel 12, the yarn-ends 24 move to the traverse guide 14 and thence to the driven reel 16 to form the beam.

With the exception of the monitoring apparatus 10, the installation thus far described is conventional and has been illustrated only schematically. In other textile operations, the yarn-ends 24 could move continuously to any desired point of subsequent use other than the illustrated beaming reel 16.

Viewing FIG. 2, it is seen that guide bars 28 and 30 extend from side to side of frame 18. The same is also true of the monitoring apparatus 10, the drop wire strip 36, a rod 38 and the second eyelet guide 34. The individual drop wires 32 are pivoted on rod 38, for a purpose which will be described more fully hereinafter.

The monitoring apparatus 10, which forms the subject matter of the present invention, is further illustrated in FIGS. 3–5. In FIG. 4, where the detector unit per se is best illustrated, a pair of end mounts 40 serve as a support for a detector bar 42 which is suitably fastened at each end to one of the mounts 40. This unit construction is isolated from frame 18 by opposed rubber shock absorbers 44. The bar 42 is recessed to receive a third ceramic guide bar 46, over which the yarn-ends 24 pass. There is a position pin 48 on each mount 40 and an elongated flexible filament 50 passes over the adjustable pins 48. Filament 50 is attached at one end thereof to an anchor 52 on one of the mounts 40 and at its other end to an anchor spring 54, which functions to maintain the filament under tension. A steel probe pin 56 extends upwardly through suitable passages in bar 42 and the associated mount 40 into engagement with the tensioned filament 50. Pin 56 is attached to a crystal phonograph pickup 58 or other suitable transducer, which has leads 60 extending therefrom.

The adjustable feature of the position pins 48 is shown in FIG. 5. Each pin 48 is provided with a peripheral, eccentric groove 49, a locking slot 51, and a key-way 53. A set-screw 55 engages pin 48 in slot 51. When set-screw 55 is withdrawn, each pin 48 may be rotated relative to the mount 40, to raise or lower filament 50 relative to the yarn-ends 24 and thus provide a sensitivity adjustment. This adjustability feature is also desirable, for example, where a wide range of yarn deniers may be run on a particular installation.

Figure 6:
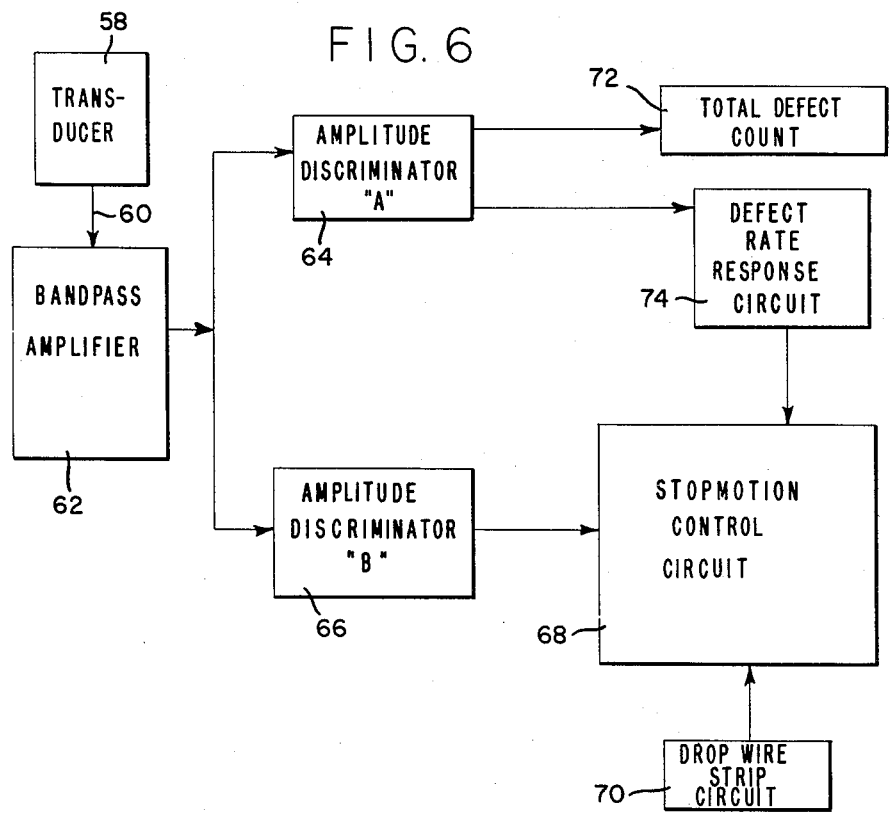
FIG. 6 is a block diagram of the circuitry employed with the monitoring apparatus of FIG. 1.

The block diagram of FIG. 6 shows that an electric signal emanating from transducer 58 passes to an amplifier 62, whence it is applied to separate amplitude discriminator circuits 64 and 66. Discriminator 66 passes only those signals of relatively large amplitude, which signals activate a stop motion circuit designated 68. Parenthetically, it should be noted that the stop-motion circuit 68 is conventional and additionally may receive the output of the circuit 70 which includes the drop wires 32 and the drop wire strip 36. The other discriminator 64 passes all signals from bandpass amplifier 62 to a total defect counter 72 and to a defect rate response circuit 74. The output of circuit 74 goes to control circuit 68, along with the outputs of discriminator 66 and, if desired, drop wire strip circuit 70.

In operation, the yarn-ends 24 travel continuously through the path outlined above, passing under the ceramic guide bar 28, over the guide bar 46 forming a part of the detector unit, over guide bar 30, through the drop wires 32 and to eyelet guide 34. The guide bars 28, 46 and 30 serve as hold-down and reference surfaces to maintain the spacing between the warp and the filament 50, as long as normal winding tensions are applied to the yarn-ends 24. As noted previously, the position of filament 50 relative to the warp sheet may be varied by adjustment of the pins 48 (FIG. 5). This adjustment permits variation of the apparatus sensitivity as desired. When the filament 50 is contacted by a defect in an individual yarn-end of the moving warp, it is caused to vibrate at its natural or resonant frequency. Because of the sensitive state of the tensioned filament 50, the least energy will excite it to resonant vibration. This vibration is conducted to the transducer 58 by the stainless steel probe pin 56. By virtue of the mounting of transducer 58 on bar 42, filament 50 is not encumbered thereby and is free to vibrate responsive to the slightest yarn surface defect. Of course, the same result is achieved when transducer 58 is mounted on some other fixed structure, such as directly on frame 18, as long as probe pin 56 extends into engagement with the filament. The transducer converts the mechanical energy of the vibration into an electrical signal, usually ranging from 10–1000 millivolts, depending on the speed and mass of the contacting defect. The magnitude of the signal is therefore a reasonably accurate measure of the defect size.

The filament 50 may be made from any material having suitable dead time and load characteristics. Nylon, in particular, is preferred because of its high "damping factor," i.e., the ability to recover rapidly to the non-vibrating or undisturbed state in a period of about 4 milliseconds so as to permit discrimination between defects which occur almost simultaneously. When compared with stainless steel, nylon filaments have been found to be approximately ten times faster in recovering to the undisturbed state. For these reasons, nylon monofilaments of from 1 to 8 mils in diameter are preferred. Any of the other thermoplastic materials may be used provided it is capable of maintaining the required tension for extended periods of time, i.e., provided that it does not creep or flow under load conditions. There are no practical restrictions on the length of the detector filament, good results having been achieved in monitoring warps of 30 ends or more.

The monitoring apparatus 10 is a highly sensitive device and, for that reason, should be suitably isolated from the frame 18, in order to minimize outside effects. The practice of employing shock absorbers 44 between the mounts 40 and frame 18 insures that the signal amplitude ratio of small yarn-end defects, as compared to the ambient "background" noises from other plant operations, is sufficiently great. The employment of rubber-to-metal shock mounts has made possible a signal amplitude ratio of at least 5 to 1.

The signal emanating from bandpass amplifier 62 has many alternative uses. To provide complete inspection of the warp, the circuitry described above has been employed, in which the amplified signal is applied to two separate amplitude discriminator circuits 64, 66. The circuit 66 passes only those signals of relatively large amplitude which in turn energize the stop-motion control circuit 68 and thus the motor M which drives the reel 16. Such large signals result from the detection of gross defects in one or more of the moving yarn-ends. The discriminator circuit 64 passes all signals greater than the "background" level, which signals are used to actuate the defect counter 72 and to energize the rate response circuit 74. When the total number of defects or the frequency of defect occurrence becomes excessive, there is an output from rate response circuit 74 to the stop-motion control circuit 68. As an example of the alternative uses, the amplified signal can also be recorded graphically, thus providing a permanent record of the defect count as well as an estimate of their relative magnitudes.

The guide bars 28, 30 and 46 are made of "Al Si Mag," a ceramic material which possesses the necessary wear resistance required in the present use. The guide bars function to maintain the yarn-ends 24 in sheet form, i.e., as a warp, as well as to maintain an essentially constant warp-to-detector filament distance. The guide bars 28 and 30 are conventional and are employed with the apparatus 10 of the present invention in order to obtain added warp stability. However, only the guide bar 46 is essential in the operation of the apparatus 10 at ordinary operating tensions.

The tension on the individual yarn-ends 24 is sufficient to retain the associated drop wire 32 pivoted upwardly out of contact with the drop wire strip 36. Should one of the ends 24 part, its drop wire 32 will fall by gravity into contact with the strip 36, thus energizing the circuit 70 (FIG. 6). It is apparent, therefore, that the control circuit 68 has three inputs, any one of which can cause the warping operation to be shut down until the indicated difficulty can be remedied. In the case of a broken yarn-end, circuit 70 is energized; excessively large surface irregularities cause circuit 66 to be energized; and an excessive number or rate of defects causes energization of circuit 74.

While a preferred embodiment of the apparatus of this invention has been described, it is apparent that many changes of material and modifications of design can be made without departing from the concept of the invention. An important modification of the above apparatus is that wherein the detector filament is caused to vibrate continuously. Any external contact with the vibrating detector filament causes a momentary cessation or disturbance of the vibration, which can be suitably detected. The degree of sensitivity of the vibrating system is essentially the same as in the non-vibrating system, and in certain applications the use of the former is to be preferred.

The nature of the filamentary structure being monitored is not critical. Threads or continuous-filament yarns composed of either man-made or natural fibers can be monitored according to the present invention. The detector is also useful in the manufacture of wires or rolled sheet materials. Two or more detectors can be used in combination, with one or more detectors located both above and below the moving materials, thereby providing a complete and accurate inspection of the warp.

Several advantages derive from the practice of this invention, primary among which are low apparatus and operating costs, as well as reduced maintenance requirements, due to the long term sensitivity stability of the monitoring apparatus. The sensitivity of the apparatus is easily adjusted, permitting the detection of defects ranging from the gross "creel mirror" variety, i.e., fluffs, loops, harsh or broken filaments, and slubs, to those defects which are barely visible. The apparatus of the present invention eliminates the human element from product quality control, without obstructing the normal travel of the filamentary structures, and contact with such structures is at a minimum. The practice of this invention requires no special material handling or sampling operations, since, owing to its compactness, the apparatus can be placed at any desired stage in the manufacture of filamentary structures. Other advantages inherent in the practice of this invention will occur to those undertaking its practice.

We claim:

1. Apparatus for detecting surface defects in a continuously moving filamentary structure, said apparatus comprising: a support frame; means on said frame for guiding said structure; an elongated flexible detection element mounted under tension on said frame in proximal traversing relationship to said structure; transducer means on said frame; and a probe extending outwardly from the transducer means into engagement with said element whereby to transmit all vibrations imparted to said element by surface defects into usable electric signals.

2. Apparatus for monitoring yarn surface defects, said apparatus comprising: a support frame; a nylon filament mounted under tension on said frame; a transducer mounted on said frame; and a probe extending outwardly from said transducer into engagement with said filament whereby to transmit all vibrations imparted to said filament by surface defects of yarn passing in proximal traversing relationship therewith to said transducer for conversion into usable electric signals.

3. Apparatus for monitoring yarn surface defects, said apparatus comprising: a support frame; guide means on the frame for warping a plurality of continuously moving yarn-ends; spaced mounts on the frame; a flexible filament suspended under tension between said mounts in proximal traversing relationship to said yarn-ends; a transducer on said frame; and a probe extending outwardly from said transducer into engagement with said filament whereby to transmit all vibrations imparted to said filament by yarn surface defects to said transducer for conversion into usable electric signals.

4. Apparatus for monitoring yarn surface defects, said apparatus comprising: a support frame; guide means on the frame for warping a plurality of continuously moving yarn-ends; spaced mounts on the frame; a flexible filament suspended under tension between said mounts in proximal traversing relationship to said yarn-ends; a transducer on said frame; and a probe extending outwardly from said transducer into engagement with said filament whereby to transmit all vibration imparted to said filament by yarn surface defects to said transducer for conversion into usable electric signals, there being an anchor and a position pin provided on each mount, each end of said filament being attached to an anchor and trained over a pin, each pin having a peripheral eccentric filament-receiving groove and being mounted for rotation about the pin axis to permit adjustment of the filament relative to the yarn ends, said filament being slidable along said probe during such adjustment.

5. The apparatus of claim 4 wherein is provided circuit means coupled to said transducer and including a counter mechanism for recording the total number of defects in the plurality of continuously moving yarn-ends.

6. The apparatus of claim 5 wherein said filament is made of a synthetic polymer.

7. The apparatus of claim 5 wherein said filament is made of nylon.

References Cited in the file of this patent

UNITED STATES PATENTS

| | | |
|---|---|---|
| 2,295,795 | Keeler | Sept. 15, 1942 |
| 2,524,579 | Taylor | Oct. 3, 1950 |
| 2,578,620 | Wilhelm | Dec. 11, 1951 |
| 2,834,207 | Chamberlain et al. | May 13, 1958 |